United States Patent
Philipson et al.

(10) Patent No.: US 6,334,046 B1
(45) Date of Patent: Dec. 25, 2001

(54) INFORMATION MANAGEMENT SYSTEM

(75) Inventors: Lars Philipson; Per Svensson, both of Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/213,869

(22) Filed: Dec. 17, 1998

(30) Foreign Application Priority Data

Dec. 29, 1997 (SE) .................................................. 9704885

(51) Int. Cl.[7] .............................. H04Q 7/12; H04Q 7/20
(52) U.S. Cl. ......................... 455/66; 455/412; 455/458; 455/418; 455/461; 340/7.1; 340/7.21
(58) Field of Search ............................. 455/66, 461, 417, 455/445, 403, 566, 567, 466, 556, 458, 53, 55.1, 412, 418, 419; 379/67.1, 89; 340/825.52, 7.21, 7.1

(56) References Cited

U.S. PATENT DOCUMENTS

| | | | |
|---|---|---|---|
| 5,016,269 | 5/1991 | Rogers | 379/59 |
| 5,459,458 * | 10/1995 | Richardson et al. | 379/53 |
| 5,627,764 * | 5/1997 | Schutzman et al. | 455/66 |
| 5,634,100 | 5/1997 | Capps | 395/209 |
| 5,797,089 * | 8/1998 | Nguyen | 455/403 |
| 5,825,854 * | 10/1998 | Larson et al. | 379/67 |
| 5,873,108 * | 2/1999 | Goyal et al. | 345/339 |
| 5,922,058 * | 6/1999 | Fishman et al. | 710/587 |
| 5,929,774 * | 7/1999 | Charlton | 455/556 |
| 5,933,778 * | 8/1999 | Buhrmann et al. | 455/461 |

FOREIGN PATENT DOCUMENTS

| | | |
|---|---|---|
| 6-188780 | 7/1994 | (JP) . |
| 96/02036 | 1/1996 | (WO) . |
| 97/29606 | 8/1997 | (WO) . |
| 97/47120 | 12/1997 | (WO) . |

OTHER PUBLICATIONS

"Timex Data Link Users Guide", The Timex Data Link of Timex Corporation, 1994.

* cited by examiner

Primary Examiner—William Trost
Assistant Examiner—Simon Nguyen
(74) Attorney, Agent, or Firm—Burns, Doane, Swecker & Mathis, L.L.P.

(57) ABSTRACT

A personal information management system includes a personal information manager having a first transceiver and a first storage device for personal information and a communication system, the communication system having a second storage device for personal information, connected to second transceiver. A bi-directional link between the first and second transceivers provides automatic information exchange between the communication system and the information manager whenever the communication system and the information manager are within the range of the link.

5 Claims, 5 Drawing Sheets

INFORMATION MANAGEMENT SYSTEM

The present invention relates to a personal information management system, and particularly to a system comprising at least a personal information manager, including first transceiver means and first storage means for personal information, and at least a communication system, connected to second transceiver means and to second storage means for personal information.

BACKGROUND

The need of personal information management has become increasingly important to busy-life users of personal computers. The recent development of hand-held PC's and portable digital organizers clearly indicates that the trend is towards bringing personal information closer to the user. To meet this requirement several vendors offer different kinds of devices such as digital planners, digital personal organizers, electronic calenders etc.

The Timex Data Link of Timex Corporation, disclosed in The Timex Data Link Users Guide, 1994, comprises a watch that can store different kinds of information that are supplied by an application on a PC (Personal Computer). The information is transferred by light signals from the PC screen to the watch. Thus, the information transfer is one way only. The Timex Data Link has the ability to store appointments, anniversaries, phone numbers and tasks. Further, it has alarms, a stop watch an it provides the time in two time zones. The Timex is updated from a PC running the program Shedule+ under Microsoft Windows. In Schedule+ there is a button that transfers data to the Timex by letting the screen flicker while the user holds the watch in front of the screen. The light from the flickering screen is registered by the Timex and inter preted as data. The update takes about one minute depending on the amount of data transferred. Before the transfer the user has to choose data to be transfered, since the space is limited in the watch. The transfer is not incremental, hence, all information is transferred every time.

The CASIO VDB-200B, Ketonic AB, Winlöf & Co, 1996, is a watch with the ability to store telephone numbers and other personal information. Further, the DB-200 provides for basic clock functions such as stop watch, timer alarm and a telememo function. However, the watch has no abilities whatsoever to synchronize with other products such as PCs.

Another product from Casio is the CASIO DBC-310, Bäck i Backen AB/Cebes Prod. Åkersberga, 1996. It is a wrist-worn watch, which in addition to conventional clock functions has the capability to store phone numbers and appointments. It also has a built-in calculator. This watch is not provided with any means or functions enabling synchronization with any other information source.

Experience has shown that if the information updating requires user action the user just updates information for a couple of weeks and then it stops.

The Palm pilot from U.S. Robotics is a product that works close together with a PC PIM application. It is a small computer-like device with a relatively large touch sensitive screen. It synchronizes with a PIM application after it has been put in a docking station connected to a computer.

Another device is REX of Rolodex, a PC card equipped with a screen and buttons. The REX synchronizes with the PIM application after it has been inserted into the PC card slot.

SUMMARY

The present invention is directed to a personal information management system, comprising a worn personal information manager and a communication system, wherein said management system provides for bi-directional information exchange between said information manager and said communication system. Thus it should be possible to modify or discard information in said information manager and send the modified information from the information manager to the communication system. According to an example embodiment this is obtained by means of a bi-directional link, which together with the customized communications protocol provides for regular synchronization between said information manager and said communication system. Hence, the information exchange between the information manager and the communication system does not require user interaction.

Another object of the invention is to provide a method of information exchange between the communication system and the information manager.

An aspect of the invention is to provide a method of storing a current event time in said information manager, wherein said event time is transferred as modified information to said communication system computer device where the database is updated.

Another aspect of the invention is to provide for a method of storing time invervals between at least two control time-stamps, between the beginning and the end of a particular task.

These aspects are obtained by means of an integrated real-time clock of the information manager.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION

Figure 1:
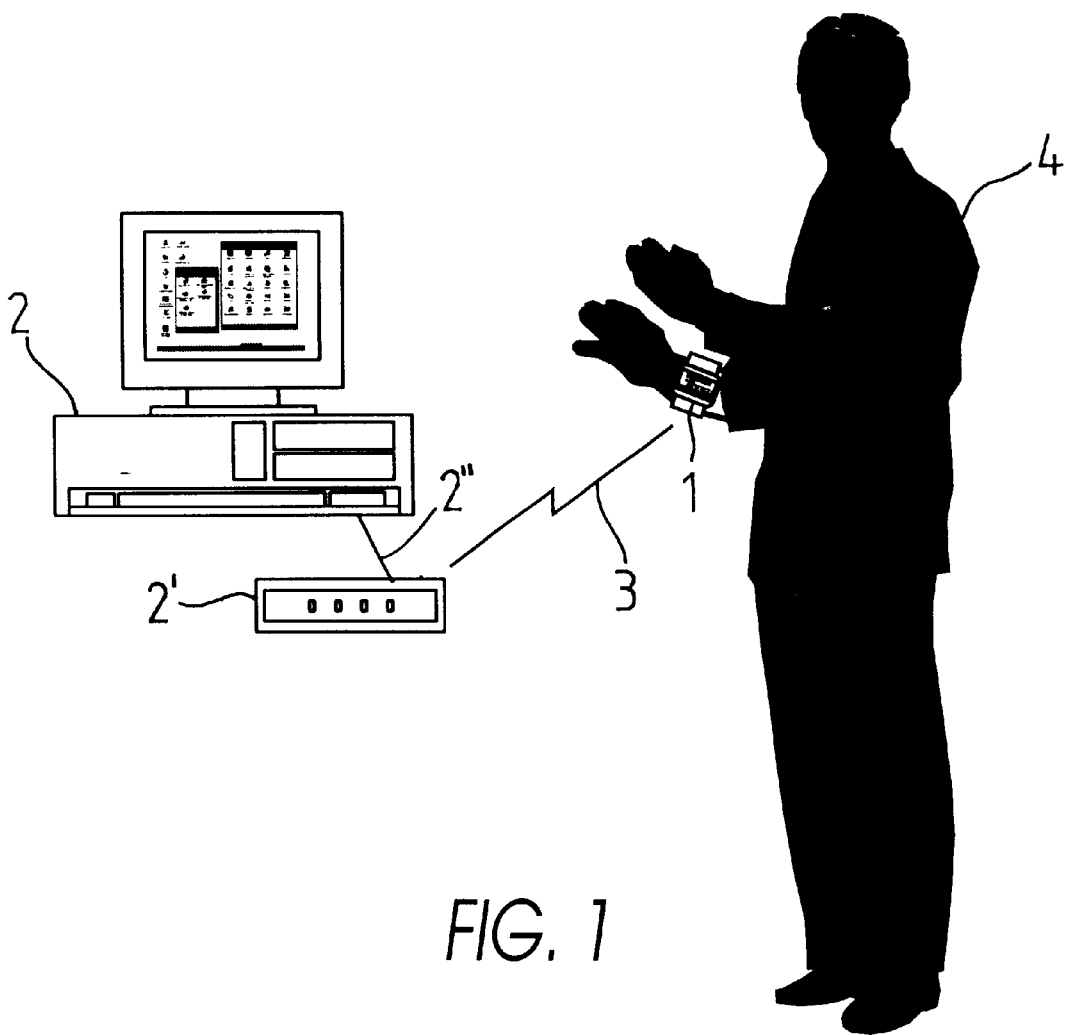
FIG. 1 is a schematical view of a personal information management system, comprising a worn personal information manager and a computer device according to the invention.

The present invention is a personal information management system, comprising a personal information manager 1, including a real-time clock, first transceiver means, first storage means for personal information, a communication system such as a computer device 2, including second transceiver means 2' connected to said device 2 through a physical link 2", and a link 3 for bi-directional information exchange between said information manager 1 and said computer device 2. In the preferred embodiment of the invention the information manager 1 is in the shape of a wristwatch worn by a person 4. In the embodiment shown in FIG. 1 the communication system or computer device 2 is a desktop computer (PC). However, in other embodiments of the invention the computer device 2 can be a notebook, a personal digital assistant (PDA), a handheld computer etc. The system according to the invention provides a convenient and powerful aid to users of for example PDAs. Personal information stored in the PC will automatically or without user interaction be transferred to the information manager, when they are within the range of the link 3, described later. Once the information has been transferred it is stored in the information manager 1 and will be available therein even when the user is out of range from the link.

It also possible to modify or discard parts of information in the information manager 1 and send the changes from the information manager 1 back to the computer device 2. In the preferred embodiment of the invention, this is accomplished by means of a short range radio link 3, which together with a customized communications protocol, described later, provides regular synchronization between the information manager 1 and the computer device 2. Thus, the information exchange over the radio link 3 does not require any user interaction. Depending on some conditions and limitations said information exchange is initiated. As described the information manager 1 and the computer device 2 have to be within the range of the link 3. Further, predetermined conditions can be set at the computer device 2, controlling when an attempt of establishing a connection for the information exchange should be made, for example once every hour.

Figure 2:
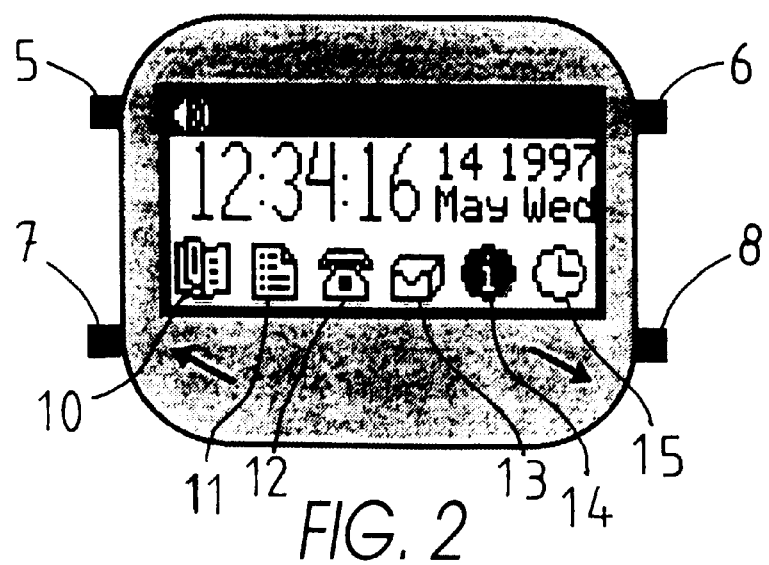
FIG. 2 is a front view of the information manager in FIG. 1.

In FIG. 2, a front view of the information manager 1 and its applications are illustrated. In the embodiment shown in FIG. 2 the information manager 1 has four buttons 5, 6, 7, 8, as input means, each with the same function all the time. This is intended for user friendliness, that is the user always knows the effect of a particular button. The upper left button 5 is a back button, which takes the user to the previous screen. The upper right button 6 starts applications, opens menues and performs actions. The lower left button 7 is used to scroll left and up, and the lower right button 8 is used to scroll the screen right and down. In the embodiment of the invention icons, menus, lists, popup windows and status bars are used to present information to the user. Functions such as sound, text scrolling and a backlight are used to enhance the user interface. Thus, information selected by the user 4 is displayed on a screen 9.

Except for the information exchange function, the information manager 1 has additional applications: a calendar application 10, showing events, meetings and tasks; tasks application 11, showing tasks; contacts application 12, showing names with email and phone numbers; inbox 13, showing email subjects, SMS; information 14, showing various information collected on the Internet like weather forecasts, stock quotation etc.; clock functions 15, such as worldclock, alarm, stopwatch, timer etc provided by a real-time clock. The first five applications 10–14 show and handle information sent from the computer device 2.

Figure 3:
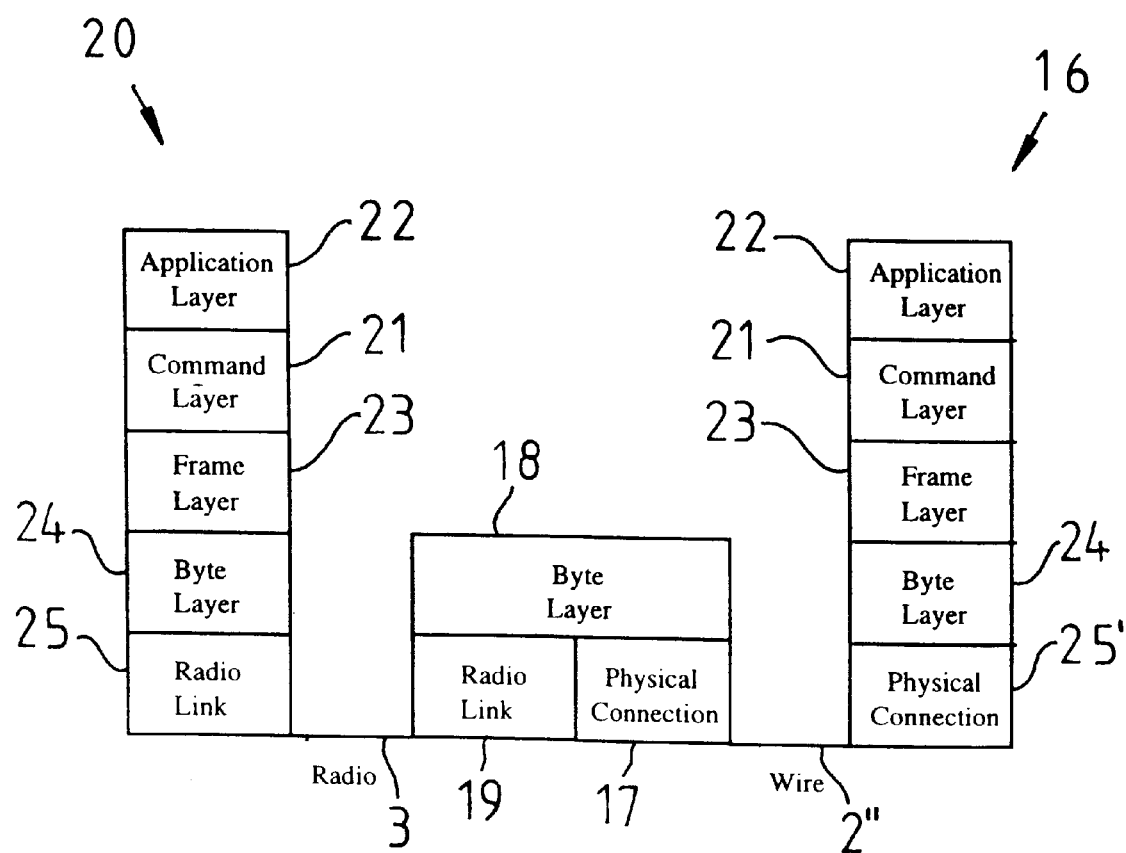
FIG. 3 is a schematical view of protocol stacks according to the invention.

A customized protocol is provided to ensure efficient use of the radio link 3, illustrated in FIG. 3. The protocol also handles error detection and flow control. Futher, a data protection code is tied to every packet, so that information is not sent to the wrong destination watch.

The protocol is implemented in the information manager to ensure reliable and error free data communication with the computer device, on a point-to-point radio link 3. In order to establish a connection and transfer information between the information manager 1 and the computer device 2, transceiver means are needed in both the information manager 1 and the computer device 2. The information manager 1 is provided with first transceiver means, described later, and the computer device 2 is provided with second transceiver means 2', a plug-in radio in the embodiment, see FIG. 1. The plug-in radio is connected to the computer device 2 through a serial PC-card. The protocol is based on the high level datalink control, HDLC, protocol. FIG. 3 illustrates the protocol stacks used by the protocol for transferring data between the information manager 1 and an application running on the computer device 2. An information manager stack 16 represents the computer device 2. It has a direct physical connection 2" with the plug-in radio, represented by a physical connection layer 17 in one of two stacks 18, shown in FIG. 3. The radio communicates with the information manager 1 through a radio link 3, a single, half duplex radio channel, represented by a radio link layer 19. A left stack 20 represents an information manager stack.

Commands and responses are transferred at the command layer 21 between applications on the computer device 2 and the information manager 1, respectively. It is the application that initiates all transfers at the highest level, an application layer 22. A frame layer 23 ensures reliable and errorfree transmission of frames. It also handles flow control, provides error control and data transparency. Further, a byte layer 24 is responsible for the synchronization with the radio and peer entity at the lowest level of communication. It also establishes contact between the radio 2' and the information manager 1 when the data transmission link is needed, a radio link layer 25.

As described above two separate physical layers exist between the information manager 1 and the computer device 2. The first is the radio link 3 between the information manager 1 and radio 2'. Then, the radio is connected to the computer device 2 via the physical link 2", a serial PC-card, handled by a physical connection layer 25' in the computer device 2.

Figure 4:
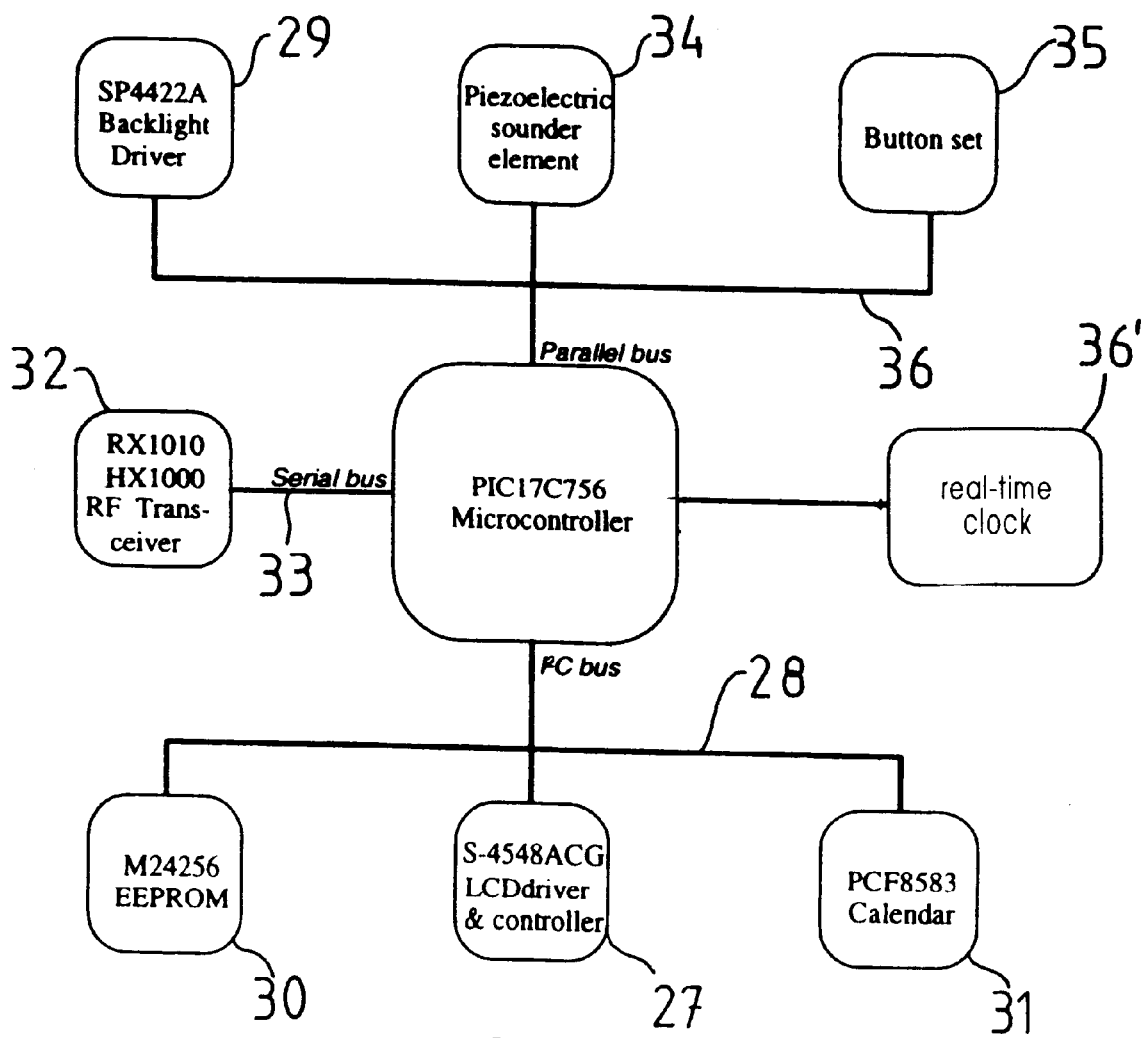
FIG. 4 is a schematic diagram of the hardware components of the information manager in FIG. 2.

The information manager 1 is constructed of electronic hardware components from various manufactures. An embodiment of the hardware of the information manager is shown in FIG. 4. The processing element of the information manager 1 is a microchip technology PIC17C756 microcontroller 26. This device has 32 kbits of integrated program memory and a RAM of 902 bytes. A 3.579 MHz is used to generate a device clock. The microcontroller 26 includes a number of peripheral features more or less important for the functions of this invention. These functions are: power-down mode with wake-up from both external and internal interrupts; two independant USART moduls; a synchronous serial port with a fully implemented master/slave $I^2C$ mode; and four timer modules with interrupt generation.

In the embodiment the information manager 1 is provided with a display 27 S-4548ACG from Seiko Instruments. It is a graphical LCD controller/driver and features 40×101 graphic segments and an on-chip oscillator circuit. All communication with the microcontroller 26 is done through its built-in $I^2C$ bus interface 28.

The display 27 is also equipped with a backlight, which is in the form of an electroluminescent piece of plastic. A Sipex SP44228 circuit 29 is used as a driver.

A 256 kbit serial electrically erasable programmable memory EEPROM 30 from SGS Thomson Microelectronics is used as a non-volatile memory for storing user data. All memory accesses from the microcontroller 26 to the EEPROM 30 are performed via the bus 28.

Further a calendar circuit 31, a PCF8583 from Philips Semiconductor, is attached to the bus 28. It is configured in the clock mode using a 32.768 KHz quartz crystal. All communication with the microcontroller 26, except for interrupt signals, is handled by means of the I²C compatible interface 28.

First transceiver means 32 consist of modules from Monolithics in the embodiment. It is on-off keyed and has a maximum data rate of 2.4 kbps. The operating frequency is 433.92 MHz. Data is sent to and from the transceiver 32 through a built-in USART module within the microcontroller 26 via a serial bus 33. Similar to the backlight 29 a piezoelectric sounder element 34 and a button set 35 is connected to the microcontroller 26 via a parallel bus 36. An integrated real-time clock 36' is included to generate suitable timing signals for the various clock functions of the information manager 1. Said integrated real-time clock 36' can be a part of said calendar circuit 31.

Figure 5:
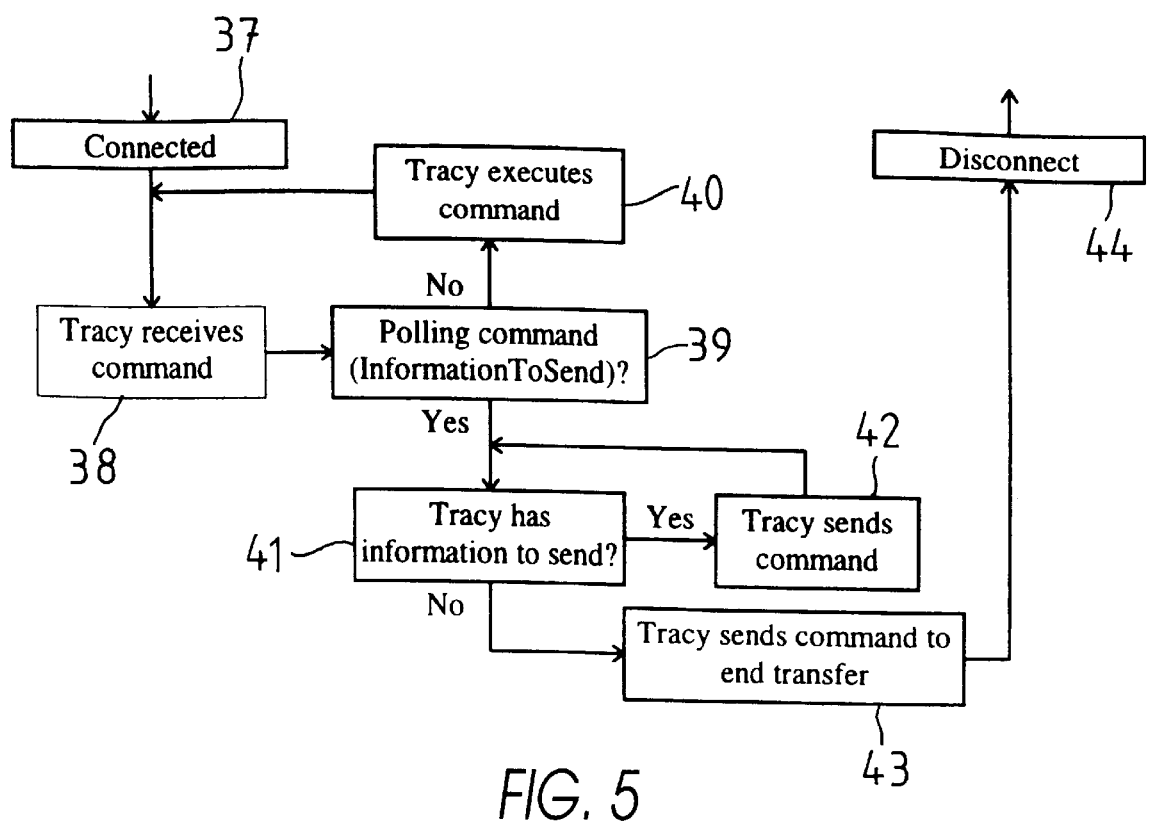
FIG. 5 is a flowchart of the information exchange method according to the invention.

The method of the information exchange according to the invention is illustated by a flow chart in FIG. 5. Since the computer device 2 always is the master, it initiates all transfers between the computer device 2 and the information manager 1. The bi-directional radio connection or link 3 is established between said computer device 2 and said information manager 1 at step 37. If there is some information modified or discarded in a database in said computer device 2, command signals are sent via said link 3 and then received by the information manager 1 at step 38. Thus, if there is any modified or discarded information in the databases of the computer device 2 and no polling command signals are sent, checked at step 39, the information manager executes the present command, causing manipulations of the databases and settings in said information manager at step 40. This procedure is repeated until there is no command associated with modified or discarded information. Next, the computer device 2 sends a polling command to the information manager, checked at the step 39, wherein a change of the transfer direction is performed, enabling said information manager 1 to send command signals to said computer device 2.

If some information in said information manager 1 is modified or discarded, checked at step 41, the information manager 1 sends the present command to the computer device 2 at step 42. The present command initiates manipulations of the data bases in the computer device 2. If no commands are left the information manager sends a command to stop the transfer at step 43 and the connection is disconnected at step 44.

As described, to manipulate the databases and the settings in the information manager 1, there is a set of commands available to be sent to the information manager. There are a few very general commands, which means that they can be used with all the databases and settings. By using simple and general commands the command interpreter in the information manager is kept at a minimum.

To be able to use these general commands, exact copies of the information manager databases are kept in the computer device 2. This enables the computer device 2 to perform much of the logic operations needed to add, modify and delete records (information is stored in records). For example, when a new record arrives, the information manager 1 does not have to find a place for that record in a linked list since this has already been done in the computer device 2.

Figure 6:
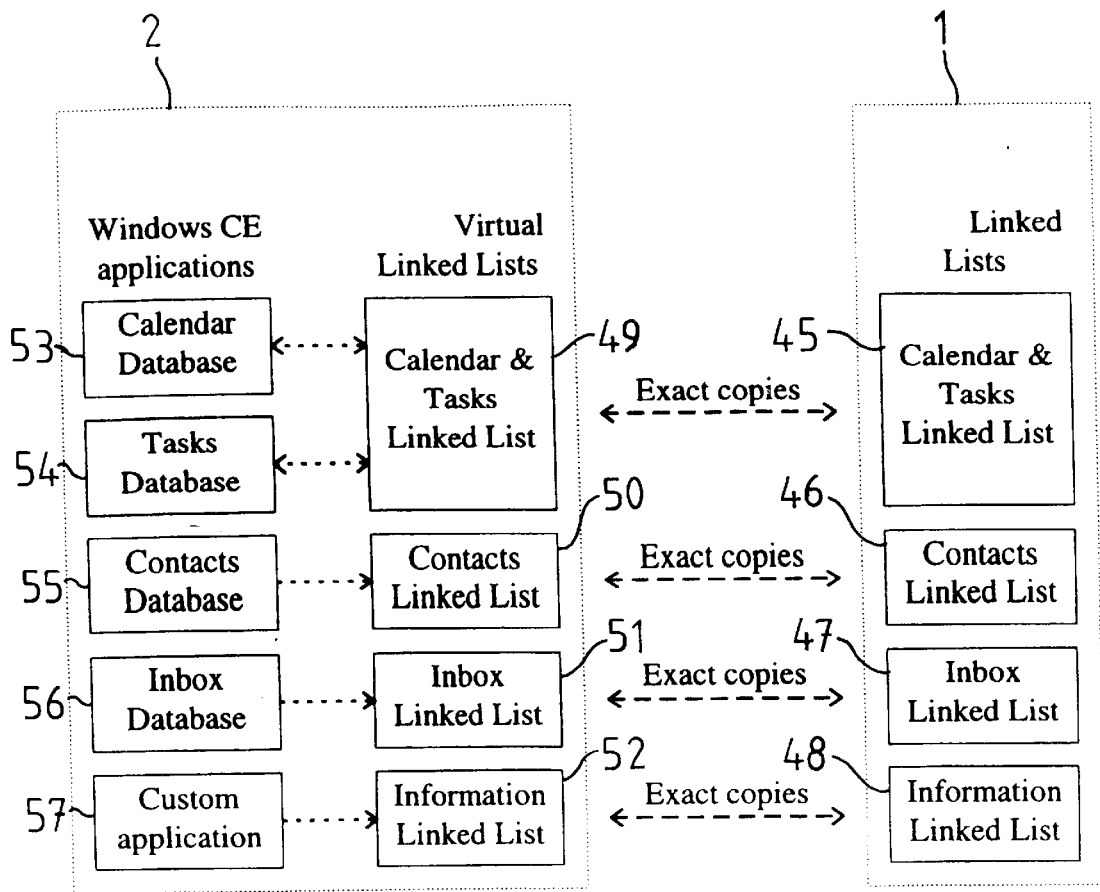
FIG. 6 is a schematical view of the databases of the information management system of FIG. 1.

The databases and linked lists used in the computer device 2 as well as in the information manager 1 are illustrated in FIG. 6. To add a record the computer device 2 first looks in its linked list for a free position, then it sends one or more write commands to the information manager 1 to fill that position in the EEPROM 30 with data, and finally it adds the record to a present linked list by sending an add command. By sending the add command to the last there is no risk for a half-filled record being added to the linked list.

To modify a record the computer device 2 sends one or more right commands to the information manager 1 for writing in the EEPROM 30. A record is deleted by sending the delete command.

When all commands have been sent from the computer device 2 to the information manager 1, the computer device 2 sends an information-to-send command. This command changes the direction of the communications channel. The information manager 1 responds by sending commands for manipulations of the databases in the computer device 2, for example removing a record from the calendar and tasks database. When the information manager receives an information-to-send command, it starts looking for items marked dirty or marked for deletion in the calendar and tasks database. For each record marked dirty, the information manager 1 sends a check calendar command to the computer device 2, and for each record marked for deletion it sends a delete command. When the entire calendar and tasks databases are walked through the information manager 1 sends a no-information-to-send command to tell the computer device 2 to stop the transfer. As shown in FIG. 6 the databases in the information manager are stored as linked lists 45, 46, 47 and 48. Exact copies of these linked lists, called virtual lists 49, 50, 51 and 52, are kept in the computer device 2. These virtual lists enable the computer device 2 to perform the logic needed to add, modify and delete records in the information manager 1, because the computer device 2 always knows where in the linked lists records are found and the neighbors of the record. To add a record the computer device 2 simply inserts it into the particular linked list. A virtual list 49–52 can contain records already in the linked list and records not yet added to the list. The records already in the list have the position, previous and next fields filled and they can be marked dirty or marked for deletion. Records not yet added to the list are waiting to be assigned a position in the linked list. This will be done at the next transfer. In order to keep the virtual lists updated with data from the real databases, it always "listens" for changes in the respective databases calendar 53, tasks 54, and contacts 55 of the computer device 2. If a record changes in one of these databases 53, 54 and 55 the corresponding record will be found in the virtual list and the record will be updated with new data and marked dirty. At the next connection between the computer device 2 and the information manager 1 the computer device 2 will transfer the change to the information manager 1. Similarly new records and records to be deleted are detected.

An inbox database 56 is associated with the information application, storing information collected on the Internet like weather forecasts, stock quotations etc, as described above.

Further it is possible for the user to make adjustments to the user interface in the information manager 1, such as set the update intervals, define filters, set alarms and time sounds and synchronize the time in the information manager 1 with the computer device time. It is also possible to reset the databases 45–48 in the information manager 1 and to force an update. These updates and adjustments are performed via a custom application 57 in the computer device 2.

An important characterizing feature of the method according to the invention is the possibility of registering and storing time-stamps for events associated with for example tasks in the tasks database 54. This is accomplished by performing a particular button sequence, wherein the current event time is registered and the information is sent to the computer device 2 from the information manager 1. The current time-stamp for this particular event is stored in the record of the associated task. It is also possible to store time intervals such as the time between the beginning of a particular task and the end of the task. When the task starts the user presses a button sequence on the information manager 1 and the current start time is stored in the EEPROM 30 of the information manager 1. At the end of said task the user press another button sequence on the information manager 1, wherein the stop-time is registered. Further, the time-stamp is calculated and stored in the EEPROM 30 in a record associated with the particular task. The information is sent to the computer device as a regular command transfer from the information manager 1 to the computer device 2, as described above.

Hence, the present invention provides a personal information management system capable of establishing a bi-directional link 3 between the information manager 1 and the computer device 2 for information exchange between the information manager and the computer device. The present disclosure of the embodiment described is to be considered as an exemplification of the invention and it is not intended to limit the invention to this specific embodiment.

For example, in another embodiment of the invention said infromation manager 1 can be in the shape of a mobile telephone, and said computer device 2 can be a laptop, a notebook, a hand-held computer, or a mobile telephone etc. Further, said computer device 2 can be any communication system, such as a LAN (Local Area Network) or a GSM (Global System for Mobile communications) system. The bi-directional link 3 can be implemented as an IR (infra red) link in other embodiments. In the described embodiment said buttons (5, 6, 7, 8) are used as input means, but said information manager 1 can be controlled via voice input in another embodiment. Additional databases, applications and functions can be added to the invention, but nevertheless be within the scope of the invention, as defined in the appended claims.

What is claimed is:

1. A method of information exchange between at least a personal information manager, including first transceiver means and first storage means for personal information, and a communication system, including second storage means for personal information, connected to second transceiver means, the method comprising the steps of:

when the transceiver means of said communication system and information manager are within the range of a bi-directional link between said communication system and said information manager, establishing a bi-directional connection between said communication system and said information manager;

using a communications protocol means to enable personal information stored in said first storage means of said information manager to be transferred without user interaction, via said link, to and received from said second storage means of said communication system, for automatic information exchange between said communication system and said information manager, the communication protocol means performing at least the steps of if information in said communication system is modified or discarded, sending command signals via said connection to said information manager causing manipulations of databases and settings in said information manager;

sending polling command signals from said communication system to said information manager causing a change of the transfer direction enabling said information manager to send command signals to said communication system;

and if information in said information manager is modified or discarded, sending command signals via said connection to said communication system causing manipulations of databases in said information manager, wherein information is synchronized between said first and second storage means; and disconnecting the connection.

2. A method according to claim 1, further comprising, preceding the step of establishing a bi-directional connection, the step of:

at a particular event, storing a current event time read from said real-time clock, as modified information, in a first storage means by activation of input means on said information manager.

3. A method according to claim 1, further comprising, preceding the step of establishing a bi-directional connection, the steps of:

at the beginning of a particular task, storing the current start time, read from said real-time clock, as modified information, in a first storage means by activation of said input means on said information manager; and at the end of said task, storing the current stop time, read from said real-time clock, as modified information, in said first storage means by activation of said input means on said information manager.

4. A personal information management system, comprising at least a personal information manager, including first transceiver means and first storage means for personal information, a communication system including second storage means for personal information, connected to second transceiver means, means for establishment of a connection via a bi-directional link between said first and second transceiver means when the transceiver means of said communication system and information manager are within the range of said link, communications protocol means enabling personal information stored in said first storage means of said information manager to be transferred without user interaction, via said link, to and received from said second storage means of said communication system, for automatic information exchange between said communication system and said information manager, and means for sending polling command signals from said communication system to said information manager causing a change of the transfer direction enabling said information manager to send command signals to said communication system, wherein information is synchronized between said first and second storage means.

5. A personal information manager, including first transceiver means and first storage means for personal information, for communication with a communication system including second storage means for personal information, connected to second transceiver means, means for establishment of a connection via a bi-directional link between said first and second transceiver means when the transceiver means of said information manager and communication system are within the range of said link, and communications protocol means enabling personal information stored in said first storage means of said information manager to be transferred without user interaction, via said link, to and received from said second storage means of said communication system, for automatic information exchange between said communication system and said information manager, wherein polling command signals are sent from said communication system to said information manager causing a change of the transfer direction enabling said information manager to send command signals to said communication system, and information is synchronized between said first and second storage means.

* * * * *